US010311237B2

(12) United States Patent
Shah et al.

(10) Patent No.: US 10,311,237 B2
(45) Date of Patent: Jun. 4, 2019

(54) MECHANISM TO SYNCHRONIZE CLIENTS IN A DIGITAL RIGHTS MANAGEMENT ENVIRONMENT

(71) Applicant: Adobe Inc., San Jose, CA (US)

(72) Inventors: Kunal Shah, Ahmedabad (IN); Nobuo Griffin, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 581 days.

(21) Appl. No.: 13/839,765

(22) Filed: Mar. 15, 2013

(65) Prior Publication Data

US 2014/0020113 A1 Jan. 16, 2014

Related U.S. Application Data

(60) Provisional application No. 61/671,634, filed on Jul. 13, 2012.

(51) Int. Cl.
*G06F 21/60* (2013.01)
*G06F 21/10* (2013.01)

(52) U.S. Cl.
CPC .............. *G06F 21/60* (2013.01); *G06F 21/10* (2013.01); *G06F 2221/2137* (2013.01)

(58) Field of Classification Search
CPC ... G06F 21/60; G06F 21/10; G06F 2221/2137
See application file for complete search history.

(56) References Cited

U.S. PATENT DOCUMENTS 8,688,588 B2 * 4/2014 Holtzman .............. G06F 21/10 705/59
9,055,080 B2 * 6/2015 Sandhu ..................... G06F 8/61
2006/0224522 A1 * 10/2006 Wald ................ G06F 17/30592 705/59
2007/0083655 A1 * 4/2007 Pedersen .............. H04L 63/102 709/226

* cited by examiner

*Primary Examiner* — Sheetal R Paulson
(74) *Attorney, Agent, or Firm* — Kilpatrick Townsend & Stockton LLP

(57) ABSTRACT

Disclosed are embodiments for determining where a license period for consuming content is expired. An exemplary embodiment involves receiving content for consumption on a client device, the content being associated with a license agreement defining a license period for consumption and determining whether the license period has expired based at least in part on a current time received from a server, the server being separate from the client device. The embodiment then involves terminating access to the content based on a determination that the license period has expired.

17 Claims, 5 Drawing Sheets

103 Heartbeat Server Device
129 Memory
139 Time Service
143 Time Stamp
136 Processor
123 Bus
104 Publisher Device
127 Memory
140 Content
141 License Agreement
134 Processor
120 Bus
109 Network
106 Client Device
126 Memory
146 Client Side Application
149 Licensed Content
153 License
156 Stop Interval
159 Start Interval
163 Probability Function
166 System Clock
133 Processor
119 Bus
113 Display
116 I/O Device(s)

MECHANISM TO SYNCHRONIZE CLIENTS IN A DIGITAL RIGHTS MANAGEMENT ENVIRONMENT

RELATED APPLICATIONS

This application claims priority to Application No. 61/671,634 entitled "Mechanism to Synchronize clients in a Digital Rights Management Environment" filed on Jul. 13, 2012 which is hereby incorporated by reference in its entirety.

FIELD

This disclosure relates generally to computer software and more particularly relates to the creation, modification, use, and distribution of electronic content.

BACKGROUND

A publisher publishes content that may be purchased by users on client devices for consumption. For example, the published content may include media content, electronic application content, and/or other types of content. Upon purchasing the content, the user may receive the content and an embedded electronic license to access the content based on the terms of the license. The electronic license may indicate that the user may access the content for a specified period of time upon which the user's license to access the content will terminate. Conventional techniques for enforcing the terms of the license involve using the system clock of the client device to determine whether license period has expired and/or whether to continue providing access to the content. However, the system clock of the client device may be compromised and may reflect an inaccurate time thereby allowing the user to continue accessing the content for a period of time that exceeds the terms of the license.

SUMMARY OF THE INVENTION

Disclosed are embodiments for receiving content for consumption on a client device, the content being associated with a license agreement defining a license period for consumption; determining whether the license period has expired based at least in part on a current time received from a server, the server being separate from the client device; and terminating access to the content based on a determination that the license period has expired.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
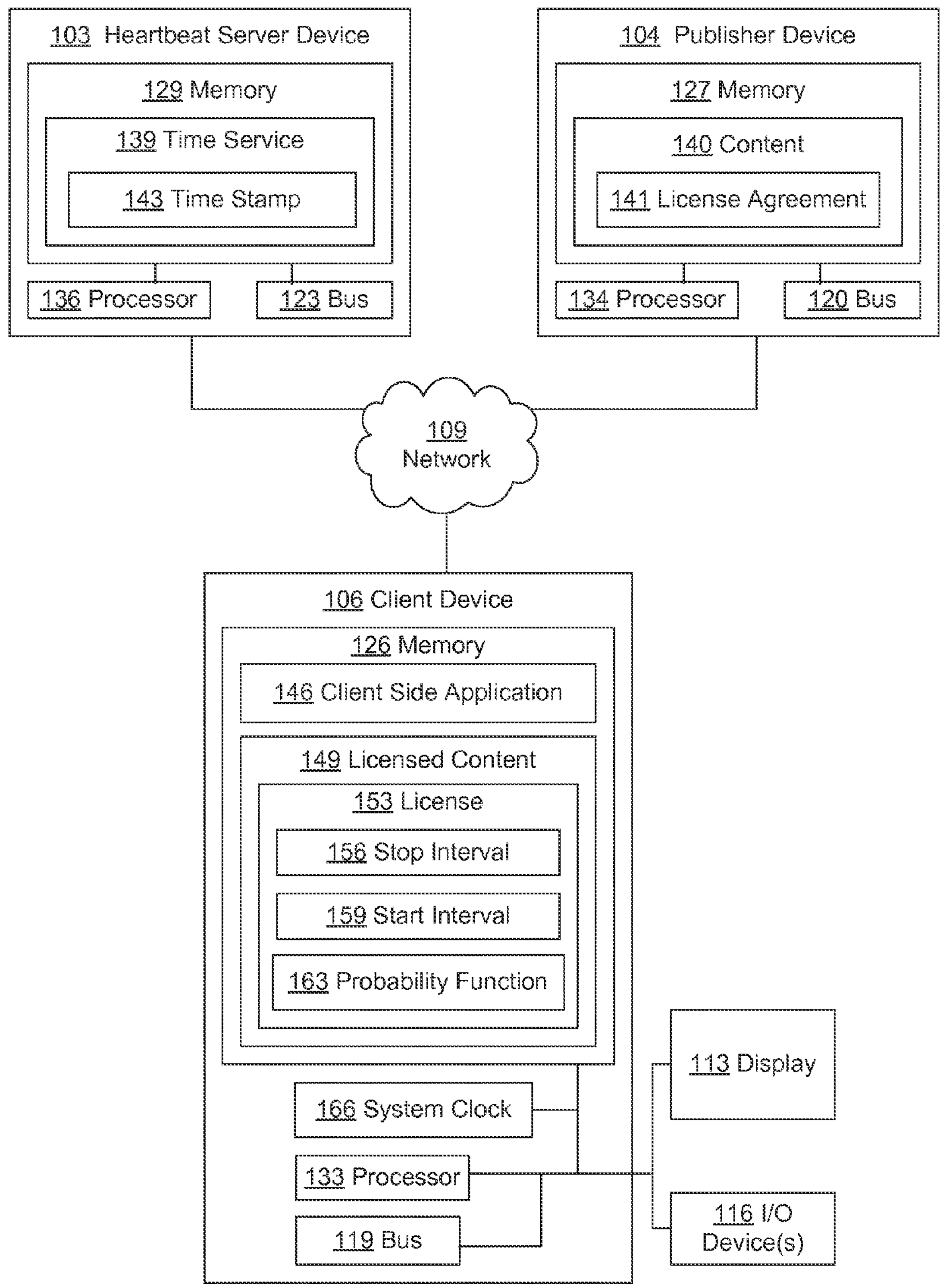
FIG. 1 is a block diagram depicting exemplary computing devices in an exemplary computing environment for implementing certain embodiments.

Disclosed are embodiments for a secured source that provides an uncompromised date and time to client devices with access to content associated with a license agreement. The uncompromised date and time may be used by a license executable embedded within the license associated with the content to determine whether a license period for consuming the content on the client device has expired. Users regularly purchase content, such as media, applications, and/or other content, for use on client devices. A publisher of the purchased content associates a license agreement that imposes terms for the consumption of the purchased content. For example, the terms may include a period of use, restrictions on a number of devices from which to consume the content, and/or other license terms for the consumption of the content. An accurate and uncompromised time is provided by a secured source, referred to as a "heartbeat" server, and is used to determine whether consumption of the content is within the period of use according to the license agreement. Determining whether the license period has expired based on the time from the heartbeat server may be more secure than relying on a local system clock of the client device which may be susceptible to modification and being compromised. The embodiments described herein provide for an approach for the publisher of the purchased content to determine the validity of a license for accessing the purchased content using a secured and uncompromised source without overloading the source.

In many instances, purchasers of the licensed content may circumvent the terms of the license agreement and consume the content outside of the terms of the license agreement. For example, the license agreement many dictate that the content be consumed up until an expiration time at which point access to the content may be terminated. Savvy purchasers may sometimes manipulate the system clock of the client device to compromise the expiration determination and continue to consume the content well beyond the licensed period.

To prevent the consumption of the licensed content outside of the terms of the license, whether use is with an expiration period may be determined based on a current time received from the secured source, i.e, a heartbeat server. The heartbeat server may provide an accurate and uncompromised current time from which a license executable associated with the content may determine whether the licensed period has expired. For example, the license executable may be embedded within the content that periodically computes whether the expiration period has expired based on a current time that is requested from the heartbeat server.

A publisher of licensed content may embed a license executable within the licensed content that executes on the client device to determine whether the consumption of the licensed content conforms to the terms of the license agreement. For instance the license executable may determine whether the license period for consuming the licensed content has expired based on a current time received from the heartbeat server.

Receipt of the current time from the heartbeat server can be controlled in various ways to prevent circumvention techniques and/or to avoid burdening communication networks and the heartbeat server. For example to avoid network congestion and heartbeat server overload, requests for current time can be sent only periodically. In one embodiment, the license executable may transmit a request to the heartbeat server if it has not done so for a given period of time. For example, it may transmit a request for the current time if the time period since the last receipt of the current time exceeds a period that corresponds to a start interval, i.e., an interval after which it starts requesting the current time from the heartbeat server. For example, the license executable may compare the time period since the last communication (e.g., 10 days since it last received the current time) with the start interval (e.g., specifying that a current time should be requested if not received in the last 7 days). If the time period since the last communication exceeds the time period corresponding to the start interval (e.g., 10 days exceeds 7 days), then the license executable transmits a request to the heartbeat server to again receive the current time. Upon receipt of the current time from the heartbeat server, the license executable determines whether the licensed period for consumption of the content has expired and if the period has expired, terminates access to the licensed period.

In the above example, receipt of the current time is based on requests that are sent or not sent based on locally-stored time. A user might try to continue unauthorized use of content by preventing the request for/receipt of the current time, for example, by manipulating the current time. Various techniques can be used to prevent such circumvention. In one embodiment, the license executable may terminate access to the licensed content if it has not heard from the heartbeat server for a given period of time. For example, it may terminate access if the time of last communication with the heartbeat server exceeds a period that corresponds to a stop interval, i.e., an interval after which it stops waiting for the current time from the heartbeat server and terminates access. For example, the technically savvy purchaser may have prevented communication with the heartbeat server by having terminated access to other devices over a network or by otherwise managing and controlling communication with other devices. For instance, the purchaser may operate the client device in "off-line" mode where there is no network connectivity for communication with any other devices over a network. Thus, no requests, such as a request to the heartbeat server, may be transmitted from the client device and the licensed content may be consumed beyond the terms of the license agreement for an indefinite period of time. A stop interval can be used to prevent such circumvention. For example, a license executable may determine if the time period since the last communication with the heartbeat server exceeds a time period that corresponds to the stop interval and, if so, terminate access to the licensed content.

Additional techniques may be used so that a user cannot prevent the request for/receipt of the current time by manipulating the locally stored time. In one embodiment, the license executable may transmit a request to the heartbeat server only occasionally but in a way that is not based on the locally-stored time. For example, determining a frequency for transmitting requests to the heartbeat server may be determined based on a probability function instead of the local clock. A test that determines when to send a request to the heartbeat server may use a probability function. For example, the test may be used so that a request for current time is sent only a percentage of the time that the executable considers sending a request. In some embodiments, the executable may consider sending a request each time the content is accessed but only send a request based on a result of the test. The test may be defined such that the test is passed or is not passed a particular percentage of the time, e.g., 10% of the time the test will pass resulting in a transmission of the request to the heartbeat server. For example, a probability function may be used to mathematically provide a result that can be compared with a threshold or range. As a particular example, the function may result in a value between 0 and 10 where the likelihood that the value will be less than 1 is 10%. To send requests only 10% of the time, the function is executed and a request is sent if the result is less than 1. In one embodiment, a random number generator may be used. The license executable may generate a random number and if the result is within a specified probability range, the license executable transmits a request to the heartbeat server to receive of the current time.

These illustrative examples are given to introduce the reader to the general subject matter discussed here and are not intended to limit the scope of the disclosed concepts. The following sections describe various additional embodiments and examples with reference to the drawings in which like numerals indicate like elements.

FIG. 1 depicts an exemplary computing environment for performing searches based on search criteria as described herein. The methods and systems disclosed herein are also applicable on other computing systems and environments. The environment shown in FIG. 1 includes a wired or wireless network 109 connecting various devices 103, 104 and 106. In one embodiment, the network 109 includes the Internet. In other embodiments, other networks, intranets, or combinations of networks may be used. Alternative configurations are possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. Exemplary devices 103 and 106 are respectively used as special purpose computing devices to provide specific functionality offered by their respective applications and by the interaction between their applications. As an example, client device 106 is shown with a display 113 and various input/output devices 116. A bus, such as bus 119, 120 and 123 will typically be included in a device as well.

As used herein, the term "application" or "service" refers to any program instructions or other functional components that execute on a device. An application or service may reside in the memory of a device that executes the application. As is known to one of skill in the art, such applications may be resident in any suitable computer-readable medium and execute on any suitable processor. For example, as shown the devices 103, 104 and 106 each have a computer-readable medium such as memory 126, 127 and 129 coupled to processors 133, 134 and 136 that execute computer-executable program instructions and/or accesses stored information. Such processors 133, 134 and 136 may comprise a microprocessor, an ASIC, a state machine, or other processor, and can be any of a number of computer processors. Such processors include, or may be in communication with, a computer-readable medium which stores instructions that, when executed by the processor, cause the processor to perform the steps described herein.

As used herein, the term "server" refers to an application that listens for or otherwise waits for requests or a device that provides one or more such applications that listens for or otherwise waits for requests. Heartbeat server device 103 and the publisher device are examples of a server. A "server device" may be used to provide an accurate and uncompromised current time from a trusted source. For example, the heartbeat server device 103 may include a time service 139 to provide the current time.

A computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

In FIG. 1, the heartbeat server device 103 includes a memory 129 that includes the time service 139. In one embodiment, the time service 139 receives a request from the client device 106 with access to the licensed content 149 and responds with a time stamp 143. The time stamp 143 includes the current time as maintained by the heartbeat server device 103 that may be used by the client device 106 to determine whether to provide access to the licensed content 149. For instance, the client device 106 may determine to terminate access to the licensed content 149 if the license period for consuming the content has expired. The client device 106 may use the time stamp 143 to determine whether the license period for consuming the licensed content 149 has expired. The publisher device 104 includes a memory 127 that includes content 140. The publisher device 104 provides the content 140 to users on client devices 106 if the users agree to the terms included in a license agreement 141 associated with the content 140.

The client device 106 includes a memory 126 that includes a client side application 146 and licensed content 149. The licensed content 149 may be media content, software applications, documents, and/or any other type of electronic content that the user on the client device 106 has previously agreed to consume according to the terms of license agreement 141 associated with the content 140. The licensed content 149 may include an embedded license with a Digital Rights Management ("DRM") executable, i.e. a license executable 153, which manages the terms for consumption of the licensed content 149. In one embodiment, the license executable 153 is configured to manage the communication with the heartbeat server device 103 based on the terms of the license agreement 141. The license executable 153 may define a consumption period for consuming the licensed content 149, specific devices from which the licensed content 149 may be consumed, and/or any other terms related to the consumption of the licensed content 149. Additionally, the license executable 153 includes a stop interval 156, a start interval 159, and probability function 163. In one embodiment, the stop interval 156 indicates an amount of time that the client device 106 may operate without communicating with the heartbeat server device 103 to receive the time stamp 143. The start interval 159 indicates an amount of time that the client device 106 may operate before a communication with the heartbeat server device 103 is initiated to receive the time stamp 143. The probability function 163 represents a probability that the client device 106 has been in operation without communicating with the heartbeat server device 103 to receive the time stamp 143.

The client side application 146 may be a browser that renders the licensed content 149 on the display 113. In one embodiment, the client side application 143 renders the content 153 according to the terms of the license 149. For example, a user operating the client device 106 may purchase access to licensed content 149, such as a movie. The user may consume the licensed content 149 for a period of time as defined by the license 153. For instance, the user may have access to the licensed content 149 to watch and/or otherwise consume the licensed content 149 for a period of time as defined by the license 153 embedded with the licensed content 149. The client side application 146 may monitor the system clock 166 of the client device 106 to determine whether the licensed period has expired. Upon determining that the license period has expired, the client side application 149 terminates access to the content 153.

As mentioned, the system clock 166 may be susceptible to modification by another application. For example, the system clock 166 may be manipulated to reflect an inaccurate time for circumventing one or more actions dependent on an accurate time. Since the system clock 146 may be used to determine whether the license period has expired, the client side application 146 may determine to continue providing access to the licensed content 149 even after the license period has expired because the compromised system clock 166 indicates an inaccurate time. To this end, the license executable 153 may periodically transmit a request to the time service 139 to receive the time stamp 143. As discussed above, the time stamp 143 includes the current time and thus functions as a trusted and secure source of an accurate time. The license executable 153 may determine whether the license period has expired based on the trusted time included in the time stamp 143 received from the time service 139. If the license executable 153 determines that the license period has expired, then the license executable 153 may terminate access to the licensed content 149.

In some instances, outbound communications from the client device 106 may be monitored such that any communications to the heartbeat server device 103 or the like may be comprised. For example, the outbound communications may be blocked, rerouted, and/or otherwise compromised such that the client side application 146 fails to communication with the heartbeat server device 103. In the event that the communications to the heartbeat device 103 are comprised, the license executable 153 may not receive the time stamp 143 from the heartbeat server device 103 and thus may not accurately determine whether the license period for consuming the licensed content 149 has expired.

To this end, the publisher of the licensed content 149 may configure the license executable 153 to be signed and protected such that it may not be compromised by another application or service. Any communications between the license executable 153 and the time service 139 may be secured. The license executable 153 is equipped with one or more of the stop interval 156, the start interval 159, and the probability function 163 in the license embedded into the licensed content 149. The stop interval 156 indicates an amount of time that may pass without receiving the time stamp 143 from the time service 139, as discussed above. The license executable 153 may detect that the amount of time since the last receipt of the time stamp 143 exceeds the stop interval 156 and terminate access to the content 153. The value of the stop interval 156 may be established by the publisher of the licensed content 149. For example, the value of the stop interval 149 may correspond to a maximum length of a license period.

The start interval 159 indicates an amount of time that may pass before forcing receipt of the time stamp 143 from the time service 139, as discussed above. The license executable 153 may detect that the amount of time since the last receipt of the time stamp 143 exceeds the start interval 159. In response, the license executable 153 transmits a request to the time service 139 to receive the time stamp 143. The license executable 153 may then determine whether the license period has expired based on the current time indicated in the time stamp 143.

The probability function 163 represents a likelihood that a communication to the time service 139 should be transmitted to receive the time stamp 143. For example, the publisher providing the licensed content 149 may determine that a client device 106 accessing the content 143 should determine whether the license period has expired based on a time stamp 143 provided by the heartbeat server device 103 on a periodic basis. In particular, the probability function 163 may reflect a probability that the expiration needs to be determined from the time stamp 143 provided by the time service 139. For example, the publisher may establish the probability based on historical and/or empirical evidence of a frequency that the system clock 146 gets compromised. As another example, the publisher may establish the probability based on a load that the heartbeat server device 103 may process. For instance, a probability of "10%" may correspond to the heartbeat server device 103 being able to process 10% of all requests from all client devices 106 that have access to the licensed content 149. In one embodiment, the probability function 163 may be associated with a random number generator and a mathematical function implemented based on the random number. The probability function 163 may also include a numerical range. In one embodiment, if the result of the mathematical function performed on the random number falls within the numerical range, then a request to receive the time stamp 143 may be forced. For example, the license executable 153 may determine whether the result of the mathematical function is within the numerical range and transmit a request to receive the time stamp 143 if the result is within the numerical range. The license executable 153 may then determine whether the license period has expired based on the current time received in the time stamp 143. In one embodiment, the license executable 153 may implement the functionality associated with the stop interval 156, the start interval 159, and the probability function 163 independently of each other.

Figure 2:
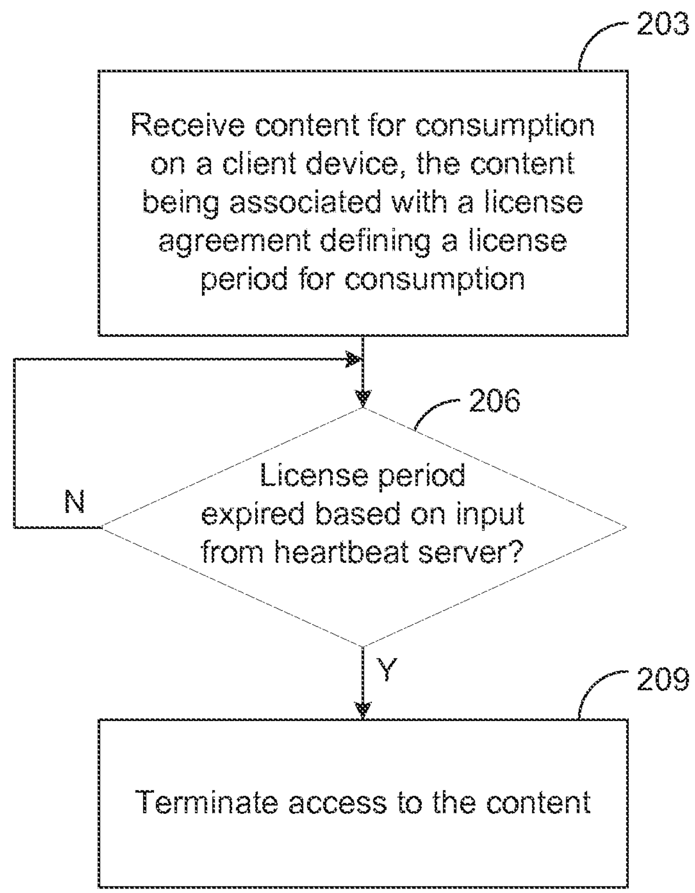
FIG. 2 is a flow chart illustrating an exemplary method for a license executable for determining if a license period for consumption of content has expired.

FIG. 2 is a flowchart that provides one example of the operation of a portion of the client device 106 according to certain embodiments. It is understood that the flowchart of FIG. 2 provides merely an example of the many different types of functional arrangements that may be employed to implement the operation of the portion of the client device 106. As an alternative, the flowchart of FIG. 2 may be viewed as depicting an example of steps of a method implemented in the client device 106 according to one or more embodiments.

Beginning with step 203, the client device 106 receives content 143 for consumption on the client device 106. The content 143 may be received from a publisher of the content 143 and may comprise media content, software application content, and/or any other content 143. The received content 143 is associated with a license agreement that defines a license period for consumption on the client device 106. Additionally, the content 143 may include an embedded license executable 153 that may be configured with a stop interval 156, a start interval 159 and a probability function 163 for accurately determining when the license period expires.

Next, in step 206, the client device 106 determines whether the license period for consuming the licensed content 149 expired based on an input from the heartbeat server 103 (FIG. 1). The input from the heartbeat server 103 is the time stamp 143 (FIG. 1) that indicates the accurate and uncompromised current time. In one embodiment, the client device 106 may request the input from the heartbeat server 103 if the time since receipt of the last input from the heartbeat server 103 exceeds a period that corresponds to the start interval 159. If the time since the last input exceeds the period, then the client device 106 transmits a request to the heartbeat server 103 to receive the time stamp 143. The client device 106 then determines whether the license period for consumption of the licensed content 149 is expired based on the time indicated in the time stamp 143. If the license period has expired, then the client device 106 advances to step 209 and terminates access to the licensed content 149. A timeout period maybe associated with step 206 if the license period is not expired based on the input from the heartbeat server 103.

Returning to step 206, the client device may also request input from the heartbeat server 103 based on the probability function 163. In one embodiment, the probability function 163 represents a likelihood that the client device 106 needs an input from the heartbeat server 103. For example, the probability function 163 may correspond to a random number with which the client device 106 implements a function to produce a result. If the result from the function is within a specified range of numbers, then the client device 106 may transmit a request to the heartbeat server 103 to receive the time stamp 143. The range may be specified by the publisher of the licensed content 149. For example, the larger the range, the higher the likelihood that the client device 106 transmits a request to the heartbeat server 103 because the result from the function is more likely to fall within the range. Similarly, the smaller the range, the smaller the likelihood that the client device 106 transmits a request to the heartbeat server 103 because the result from the function is less likely to fall within the range. The client device 106 then determines whether the license period for consumption of the licensed content 149 is expired based on the time indicated in the time stamp 143. If the license period has expired, then the client device 106 advances to step 209 and terminates access to the licensed content 149. A timeout period maybe associated with step 206 if the license period is not expired based on the input from the heartbeat server 103.

Additionally, returning to step 206, the license executable 153 may also determine whether the license period expired based on input from the heartbeat server 106 using the stop interval 156. The stop interval 156 represents a maximum amount of time that the client device 106 may operate without receiving an input from the heartbeat server 103. The client device 106 determines the time of receipt of the last input from the heartbeat server 103 and if the time of the last input exceeds the stop interval 159, the client device 106 advances to step 209 and terminates access to the licensed content 149.

Figure 3:
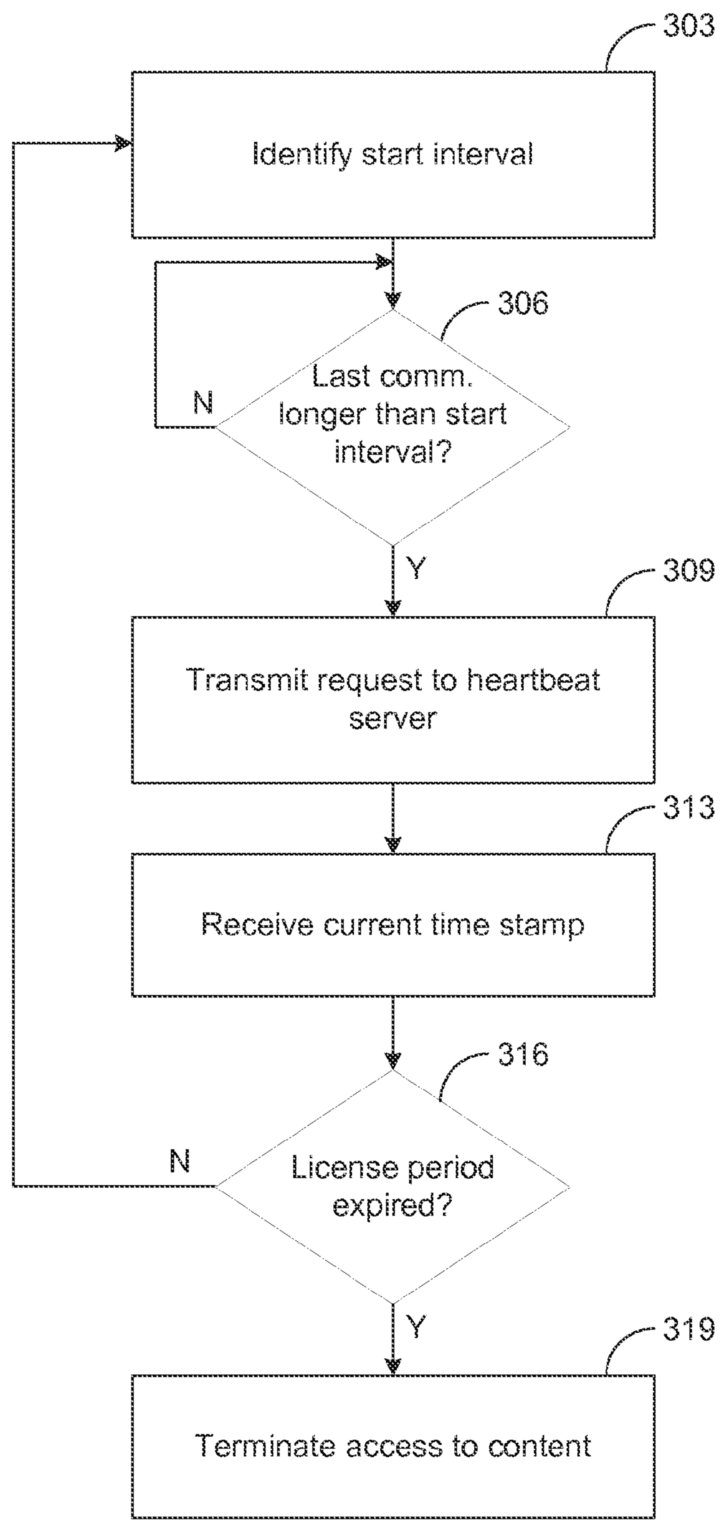
FIG. 3 is a flow chart illustrating an exemplary method for a license executable for determining whether a license period for consumption of content has expired based on a start time interval.

FIG. 3 is a flowchart that provides one example of the operation of a portion of the license executable 153 provided by a publisher of licensed content 149 according to certain embodiments. It is understood that the flowchart of FIG. 3 provides merely an example of the many different types of functional arrangements that may be employed to implement the operation of the portion of the license executable 153 as described herein. As an alternative, the flowchart of FIG. 3 may be viewed as depicting an example of steps of a method implemented in the client device 106 according to one or more embodiments. Additionally or alternatively, the flowchart of FIG. 3 may also be viewed as providing one example of the operation of the client side application 146.

Beginning with step 303, the licensed executable 153 identifies the start interval 159. As discussed above, the start interval 159 indicates an amount of time that may elapse until the license executable 153 is updated with the time stamp 143. In one embodiment, the license executable 153 may identify the start interval 159 from the license agreement embedded with the licensed content 149. The start interval 159 may be an amount of time indicated in seconds, hours, days, and/or other period of time.

In step 306, the license executable 153 determines whether the time since the last communication with the heartbeat server 103 exceeds a time that corresponds to the start interval 159. In one embodiment, the license executable 153 and/or the client side application 146 may maintain a record of a last receipt of the time stamp 143 from the time service 139. If the time since the last receipt of the time stamp 143 exceeds the time corresponding to the start interval 159, then the license executable 153 advances to step 309. The license executable 153 may only advance to step 309 if the time of last communication exceeds the time that corresponds to the start interval 159. A time out call may be associated with step 306 in the event that the time of last communication does not exceed the time that corresponds to the start interval 159. For instance, a certain amount of time may elapse when the license executable 153 does not advance to step 309 because the time of last communication does not exceed the time that corresponds to the start interval 159. In this instance, the license executable 153 may stop the approach described in FIG. 3. Alternatively or additionally, the license executable 153 may determine that the license period for accessing the licensed content 149 is valid if the time of last communication does not exceed the time that corresponds to the start interval 159 and stop the approach described in FIG. 3. In another embodiment, if the license executable 153 determines that the last communication does not exceed the time that corresponds to the start interval 159, then the license executable 153 may determine whether the license period for accessing the licensed content 149 is valid based on the stop interval 156 and/or the probability function 163 as discussed with respect to FIG. 2 and FIG. 4.

In step 309, the license executable 153 transmits a communication request to the time service 139. Then, in response, the license executable 153 receives the time stamp 166 in step 313. In one embodiment, the time stamp 143 includes the current time from the heartbeat server device 103. The current time of the time stamp 143 represents a trusted and accurate time that has not been compromised. In step 316, the license executable 153 determines whether the license period for accessing the licensed content 149 has expired based on the time received in the time stamp 143. If the license executable 153 determines that the license period has expired, then the license executable 153 advances to step 319 and terminates access to the licensed content 149. Returning to step 316, if the license executable 153 determines that the license period has not expired, then the license executable 153 returns to step 303 and may optionally restart from step 303.

Figure 4:
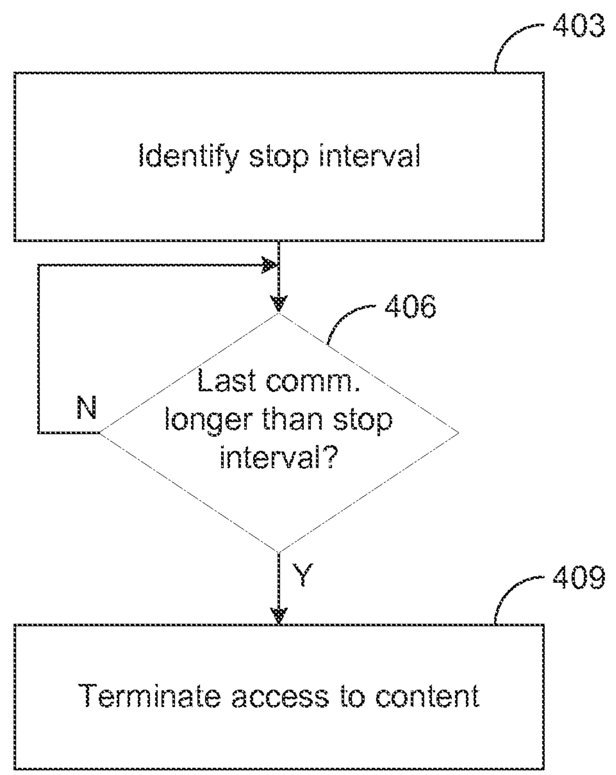
FIG. 4 is a flow chart illustrating an exemplary method for a license executable for determining whether a license period for consumption of content has expired based on a stop time interval.

FIG. 4 is a flowchart that provides one example of the operation of a portion of the license executable 153 provided by a publisher of the licensed content 149 according to certain embodiments. It is understood that the flowchart of FIG. 4 provides merely an example of the many different types of functional arrangements that may be employed to implement the operation of the portion of the license executable 153 as described herein. As an alternative, the flowchart of FIG. 4 may be viewed as depicting an example of steps of a method implemented in the client device 106 (FIG. 1) according to one or more embodiments. Additionally or alternatively, the flowchart of FIG. 3 may also be viewed as providing one example of the operation of the client side application 146.

Beginning with step 403, the license executable 153 identifies the stop interval 156. As discussed above, the stop interval 156 represents an amount of time that may pass without receiving the time stamp 166 from the time service 139. In one embodiment, the license executable 153 may identify the stop interval 156 from the license agreement embedded with the licensed content 149. The stop interval 156 may be an amount of time indicated in seconds, hours, days, and/or other period of time.

Then, in step 406, the license executable 153 determines whether the last communication with the heartbeat server 103 exceeds a time that corresponds to the stop interval 156. In one embodiment, the license executable 153 and/or the client siden application 146 may maintain a record of a last receipt of the time stamp 143 from the time service 139. If the time of last receipt of the time stamp 143 exceeds the time that corresponds to the stop interval 156, then the license executable 153 advances to step 409. The license executable 153 may only advance to step 409 if the time of last communication exceeds the time that corresponds to the stop interval 156. A time out call may be associated with step 406 in the event that the time of last communication does not exceed the time that corresponds to the stop interval 156. Then, in step 409, the license executable 153 terminates access to the licensed content 149.

Figure 5:
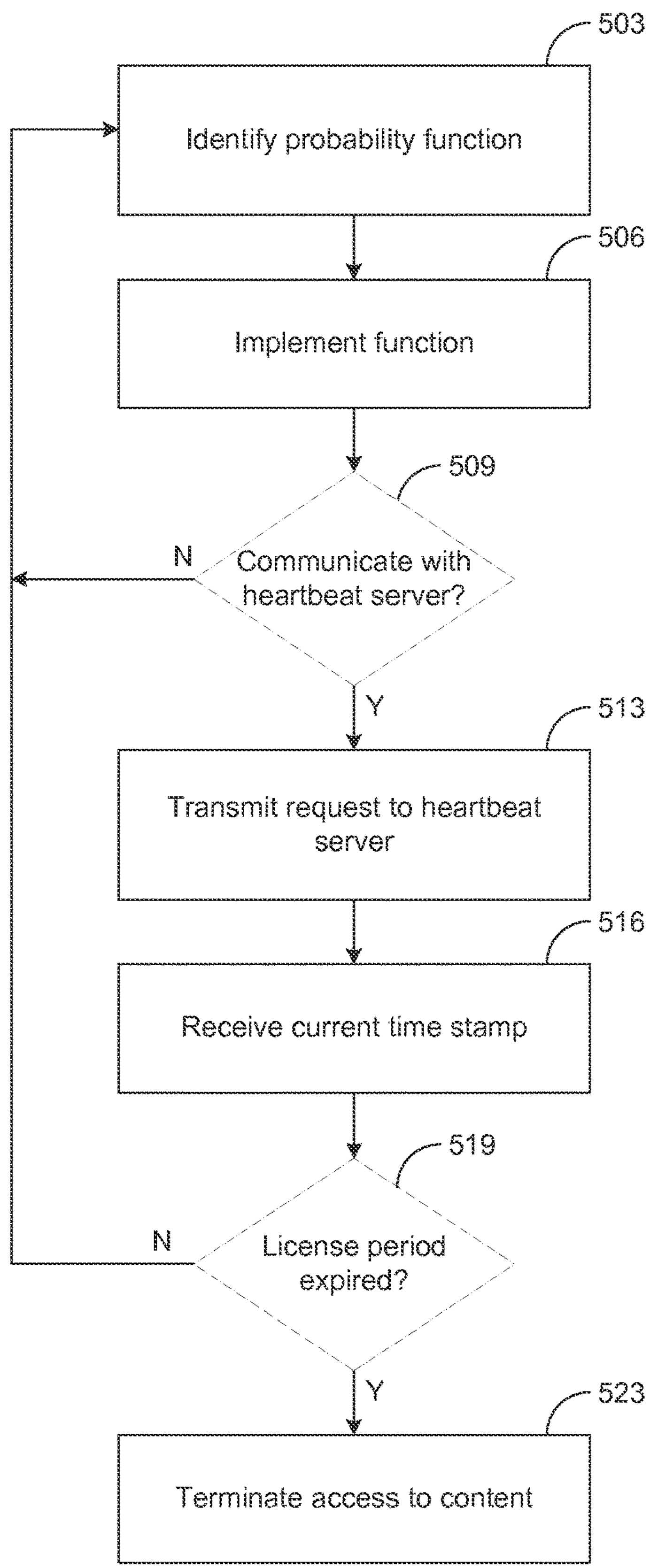
FIG. 5 is a flow chart illustrating an exemplary method for a license executable for determining whether a license period for consumption content has expired based on probability information.

FIG. 5 is a flowchart that provides one example of the operation of a portion of the license executable 153 provided by a publisher of licensed content 149 according to certain embodiments. It is understood that the flowchart of FIG. 5 provides merely an example of the many different types of functional arrangements that may be employed to implement the operation of the portion of the license executable 153 as described herein. As an alternative, the flowchart of FIG. 5 may be viewed as depicting an example of steps of a method implemented in the client device 106 according to one or more embodiments. Additionally or alternatively, the flowchart of FIG. 4 may also be viewed as providing one example of the operation of the client side application 146.

Beginning with step 503, the license executable 153 identifies the probability function 163. As discussed above, the probability function 163 corresponds to a probability that a request to the heartbeat server 103 should be transmitted. In one embodiment, the license executable 153 may identify the probability function 163 from the license agreement embedded with the licensed content 149. The probability function 163 may be associated with any function, such as a random number generator, a mathematical function based on the random number, and/or any other function. Additionally, the probability function 163 may be associated with a numerical range, as discussed above.

In step 506, the license executable 153 implements the function according to the probability function 163. For example, the function may call for generating a random number, as known in the art. Additionally, the function may also call for a mathematical function defined by the probability function 163 that is to be implemented based on the generated random number. The license executable 153 implements the probability function 163 and generates a result.

Then, in step 509, the license executable 153 may determine whether the result of the function associated with probability function 163 indicates that a communication should be transmitted to the heartbeat server 103. For example, the license executable 153 may determine whether the result of the function defined by the probability function 163 (i.e., the random number and/or the result of some other mathematical function based on the random number) falls within a number range associated with the probability function 163. In one embodiment, a smaller range may correspond to a smaller probability that the random number and/or the result of the other mathematical function falls within the numerical range. Similarly, a larger range may correspond to a larger probability that the random number and/or the result of the other mathematical function falls within the numerical range.

If the license executable 153 determines that the probability function 163 indicates that a communication should be transmitted to the heartbeat server 103, then the license executable 153 advances to step 513. If the license executable 153 determines that the probability function 163 indicates that a communication to the heartbeat server 103 is not needed, the license executable 153 returns to step 503 to restart the process. For example, the result of the mathematical function and/or the random number may fall outside of the numerical range indicating that the communication to the heartbeat server 103 is probably not necessary.

In step 513, the license executable 153 transmits a communication request to the heartbeat server 103. Then, in response, the license executable 153 receives the time stamp 143 in step 516. In one embodiment, the time stamp 143 includes the current time from the heartbeat server device 103. The current time of the time stamp 143 represents a trusted and accurate time that has not be compromised. In step 519, the license executable 153 determines whether the license period for accessing the licensed content 149 has expired based on the time received in the time stamp 143. If the license executable 153 determines that the license period has expired, then the license executable 153 advances to step 523 and terminates access to the licensed content 149. Returning to step 519, if the license executable 153 determines that the license period has not expired, then the license executable 153 returns to step 503 and may optionally restart from step 503.

GENERAL

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method for implementing digital rights management for media content comprising:

receiving, at a client device from a publisher device via a data network, media content for consumption on the client device, wherein an electronic license and a license executable are embedded within the media content, the electronic license providing access to the media content during a license period;

executing, by the client device, the license executable, wherein execution of the license executable causes the license executable to:

send, via the data network, a request for a current time to a heartbeat server, the heartbeat server being separate from the client device, receive, via the data network, the current time from the heartbeat server, and determine whether the license period has expired based at least in part on the current time received via the data network from the heartbeat server; and terminating, by the client device, access to the media content in response to the license executable determining that the license period has expired.

2. The method of claim 1, wherein the license executable determines to send the request to the heartbeat server for the current time based on a locally-stored time.

3. The method of claim 2, wherein the license executable determines to send the request to the heartbeat server based on:

identifying a start interval associated with the media content;

identifying a time of last communication by the license executable with the heartbeat server; and based on determining, with reference to the locally-stored time, that a time period since the time of last communication with the heartbeat server exceeds the start interval, sending the request to the heartbeat server to receive the current time.

4. The method of claim 2, wherein the client device terminates access to the media content in response to determining, with reference to the locally-stored time, that a time period since the time of last communication by the license executable with the heartbeat server exceeds a predetermined stop interval.

5. The method of claim 1, wherein the license executable determines to send the request to the heartbeat server for the current time without reference to a locally-stored time.

6. The method of claim 5, wherein the license executable determines to send the request to the heartbeat server to receive the current time based on a probability function.

7. The method of claim 6, wherein the probability function causes the license executable to obtain a result and to send the request to the heartbeat server based on the result being within a predetermined range of values.

8. The method of claim 1, wherein the current time from the heartbeat server is a timestamp provided to the client device.

9. The method of claim 1, wherein the publisher device is separate from the heartbeat server.

10. The method of claim 1, wherein:

the heartbeat server includes a time service;

the received current time is a trusted time received from the time service included on the heartbeat server; and determining whether the license period has expired is based on the trusted time received from the time service.

11. A non-transitory computer-readable medium on which is encoded program code for implementing digital rights management for media content, the program code comprising:

program code for receiving, at a client device from a publisher device via a data network, media content for consumption on the client device, wherein an electronic license and a license executable are embedded within the media content, the electronic license providing access to the media content during a license period;

program code for executing, by the client device, the license executable, wherein execution of the license executable causes the license executable to:

send, via the data network, a request for a current time to a heartbeat server, the heartbeat server being separate from the client device, receive, via the data network, the current time from the heartbeat server, and determine whether the license period has expired, based at least in part on the current time received via the data network from the heartbeat server; and program code for terminating access to the media content, by the client device in response to the license executable determining that license period has expired.

12. The non-transitory computer-readable medium of claim 11, further comprising:

program code for identifying a start interval associated with the media content;

program code for determining, by the license executable and with reference to a locally-stored time, a time period since a last communication with the heartbeat server, program code for determining, by the license executable, to send the request for the current time to the heartbeat server based on a locally-stored time, wherein sending the request to the heartbeat server to receive the current time is based at least in part on determining that the determined time period exceeds the start interval.

13. The non-transitory computer-readable medium of claim 11, further comprising:

program code for determining, by the license executable and with reference to a locally-stored time, that a time period since a last communication with the heartbeat server exceeds a predetermined stop interval, and program code for terminating, by the client device, access to the media content based at least in part on determining that the determined time period exceeds the stop interval.

14. The non-transitory computer-readable medium of claim 11, further comprising:

program code for obtaining, by the license executable, a result from a probability function; and program code for determining, by the license executable, to send the request to the heartbeat server is based at least in part on the result from the probability function.

15. The non-transitory computer-readable medium of claim 11, wherein the program code for sending the request to the heartbeat server further comprises:

program code for obtaining, by the license executable, a result from a probability function;

program code for determining that the result is within a predetermined numerical range;

program code for sending, based at least in part on determining that that the result is within the numerical range, the request to the heartbeat server to receive the current time.

16. A system for implementing digital rights management for media content, the system comprising:

a processor for executing instructions stored in computer-readable medium on one or more devices, the instructions comprising one or more modules configured to perform the steps comprising:

receiving, at a client device from a publisher device via a data network, media content for consumption on the client device, wherein an electronic license and a license executable are embedded within the media content, the electronic license providing access to the media content during a license period;

executing, by the client device, the license executable, wherein execution of the license executable causes the license executable to:

send, via the data network, a request for a current time to a heartbeat server, the heartbeat server being separate from the client device, receive, via the data network, the current time from the heartbeat server, and determine whether the license period has expired based at least in part on the current time received via the data network from the heartbeat server; and terminating, by the client device, access to the media content in response to the license executable determining that the license period has expired.

17. The system of claim 16, wherein communication between the client device and the heartbeat server is secure.

* * * * *